US012787058B2

(12) United States Patent
Harada et al.

(10) Patent No.: US 12,787,058 B2
(45) Date of Patent: Nov. 3, 2026

(54) TERMINAL AND COMMUNICATION METHOD

(71) Applicant: NTT DOCOMO, INC., Tokyo (JP)

(72) Inventors: Hiroki Harada, Tokyo (JP); Shinya Kumagai, Tokyo (JP); Daisuke Kurita, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 246 days.

(21) Appl. No.: 17/753,997

(22) PCT Filed: Oct. 2, 2019

(86) PCT No.: PCT/JP2019/038889
§ 371 (c)(1),
(2) Date: Mar. 21, 2022

(87) PCT Pub. No.: WO2021/064888
PCT Pub. Date: Apr. 8, 2021

(65) Prior Publication Data

US 2022/0346144 A1 Oct. 27, 2022

(51) Int. Cl.
*H04W 74/08* (2024.01)
*H04W 16/14* (2009.01)
*H04W 74/0808* (2024.01)

(52) U.S. Cl.
CPC ....... *H04W 74/0808* (2013.01); *H04W 16/14* (2013.01)

(58) Field of Classification Search
CPC ............. H04W 74/0808; H04W 16/14; H04W 56/0015; H04L 5/0053; H04L 27/0006
See application file for complete search history.

(56) References Cited

U.S. PATENT DOCUMENTS

| | | | | |
|---|---|---|---|---|
| 2013/0143502 A1* | 6/2013 | Kazmi | .................. | H04W 88/06 455/62 |
| 2016/0366618 A1* | 12/2016 | Quan | .................... | H04W 28/18 |
| 2017/0041950 A1* | 2/2017 | Wang | .................. | H04W 74/006 |
| 2017/0280440 A1* | 9/2017 | Oh | ...................... | H04W 74/006 |

(Continued)

FOREIGN PATENT DOCUMENTS

| | | |
|---|---|---|
| CN | 109286966 A | 1/2019 |
| CN | 109565834 A | 4/2019 |

(Continued)

OTHER PUBLICATIONS

Extended European Search Report issued in European Application No. 19947860.3, mailed on Apr. 5, 2023 (8 pages).

(Continued)

*Primary Examiner* — Rasheed Gidado
(74) *Attorney, Agent, or Firm* — Osha Bergman Watanabe & Burton LLP

(57) ABSTRACT

A terminal includes: a reception unit configured to receive a specific information element from a base station through system information or dedicated signaling; and a control unit configured to apply a technology for an unlicensed frequency band to a target range of the specific information element in a case where the specific information element is received. The control unit executes at least listen before talk (LBT) of the technology for the unlicensed frequency band.

4 Claims, 8 Drawing Sheets

(56) References Cited

U.S. PATENT DOCUMENTS

| | | | | |
|---|---|---|---|---|
| 2019/0149380 | A1* | 5/2019 | Babaei | H04W 72/23 370/330 |
| 2019/0281482 | A1 | 9/2019 | Yerramalli et al. | |
| 2020/0092039 | A1* | 3/2020 | Wang | H04L 1/0036 |
| 2020/0092861 | A1* | 3/2020 | Xu | H04W 72/23 |
| 2020/0154404 | A1* | 5/2020 | Göktepe | H04L 1/0061 |
| 2020/0204325 | A1* | 6/2020 | Liu | H04L 5/001 |
| 2020/0313946 | A1* | 10/2020 | Sun | H04L 27/0006 |
| 2020/0389894 | A1* | 12/2020 | Pan | H04W 72/23 |
| 2021/0007108 | A1 | 1/2021 | Tang | |
| 2021/0168759 | A1* | 6/2021 | Pan | H04W 68/02 |
| 2021/0250923 | A1 | 8/2021 | Liu | |
| 2021/0266924 | A1* | 8/2021 | Hong | H04W 72/23 |
| 2021/0367743 | A1* | 11/2021 | Kim | H04L 5/0098 |
| 2022/0070918 | A1* | 3/2022 | Fan | H04W 74/0808 |
| 2022/0173867 | A1* | 6/2022 | Nogami | H04L 5/001 |
| 2022/0256601 | A1* | 8/2022 | Harada | H04W 72/0446 |

FOREIGN PATENT DOCUMENTS

| | | | |
|---|---|---|---|
| JP | 2018513642 | A | 5/2018 |
| WO | 2016052019 | A1 | 4/2016 |
| WO | 2019174056 | A1 | 9/2019 |

OTHER PUBLICATIONS

3GPP TS 38.212 V15.6.0 "3rd Generation Partnership Project; Technical Specification Group Radio Access Network; NR; Multiplexing and channel coding (Release 15)" Jun. 2019 (101 pages).

3GPP TS 38.213 V15.6.0 "3rd Generation Partnership Project; Technical Specification Group Radio Access Network; NR; Physical layer procedures for control (Release 15)" Jun. 2019 (107 pages).

3GPP TS 38.214 V15.6.0 "3rd Generation Partnership Project; Technical Specification Group Radio Access Network; NR; Physical layer procedures for data (Release 15)" Jun. 2019 (105 pages).

3GPP TS 38.331 V15.6.0 "3rd Generation Partnership Project; Technical Specification Group Radio Access Network; NR; Radio Resource Control (RRC) protocol specification (Release 15)" Jun. 2019 (519 pages).

International Search Report issued in International Application No. PCT/JP2019/038889, mailed Apr. 21, 2020 (3 pages).

Written Opinion issued in International Application No. PCT/JP2019/038889; Dated Apr. 21, 2020 (3 pages).

3GPP TSG-RAN WG2 Meeting #106; Tdoc R2-1905701 "UE Capabilities for Supporting Unlicensed Channel measurements" MediaTek Inc.; Xi'an, China, May 13-17, 2019 (2 pages).

3GPP TSG RAN WG1 Meeting #97; R1-1906648 "On Enhancements to Initial Access Procedures for NR-U" Nokia, Nokia Shanghai Bell; Reno, USA, May 13-17, 2019 (23 pages).

Office Action issued in Japanese Application No. 2021-550835; Dated Aug. 29, 2023 (6 pages).

Office Action issued in Indian Application No. 202217024827, dated May 28, 2024 (7 pages).

Office Action issued in Chinese Application No. 201980100673.5, dated Jul. 19, 2024 (16 pages).

Office Action issued in Chinese Patent Application No. 201980100673.5, dated Jan. 21, 2025 (22 pages).

* cited by examiner

TERMINAL AND COMMUNICATION METHOD

TECHNICAL FIELD

The present invention relates to a terminal and a communication method in a radio communication system.

BACKGROUND ART

In new radio (NR) (also referred to as "5G") that is a successor system of long term evolution (LTE), a technology satisfying a high-capacity system, a fast data transmission rate, low latency, simultaneous connection of a plurality of terminals, a low cost, power saving, and the like, as a required condition, has been discussed.

In addition, in the existing LTE system, in order to expand a frequency band, the use of a frequency band that is licensed to a communication carrier (an operator) (a frequency band different from a licensed band (an unlicensed band, an unlicensed carrier, and an unlicensed CC)) is supported. For example, a 2.4 GHz band, a 5 GHz band, a 6 GHz band, or the like, in which Wi-Fi (Registered Trademark) or Bluetooth (Registered Trademark) can be used, is assumed as the unlicensed band.

Specifically, in Rel-13, carrier aggregation (CA) for integrating a carrier (CC) of a licensed band and a carrier (CC) of an unlicensed band is supported. As described above, communication that is performed by using an unlicensed band together with a licensed band is referred to as a license-assisted access (LAA).

In a radio communication system in which communication is performed by using an unlicensed band together with a licensed band, a base station apparatus (a downlink) and a user terminal (an uplink) performs channel sensing (carrier sense) in order to determine presence or absence of the transmission by other apparatuses (for example, a base station apparatus, a user terminal, a Wi-Fi apparatus, and the like), before the transmission of data in the unlicensed band. As a result of sensing, in a case where it is determined that there is no transmission by the other apparatuses, a transmission opportunity is acquired, and the transmission can be performed. Such an operation is referred to as listen before talk (LBT). In addition, in NR, a system that supports the unlicensed band is referred to as an NR-U system.

CITATION LIST

Non-Patent Document

Non-Patent Document 1: 3GPP TS 38.331 V15.6.0 (2019-06)

Non-Patent Document 2: 3GPP TS 38.212 V15.6.0 (2019-06)

Non-Patent Document 3: 3GPP TS 38.213 V15.6.0 (2019-06)

Non-Patent Document 4: 3GPP TS 38.214 V15.6.0 (2019-06)

SUMMARY OF THE INVENTION

Problem to be Solved by the Invention

There are discussions about allocating the same frequency of a part of 5G (hereinafter, referred to as a "local 5G frequency") to a plurality of licensees. That is, the same frequency is shared by the plurality of licensees. In a case where the local 5G frequency is operated, interference avoidance measures such as area adjustment may be necessary. On the other hand, there are considerations about reducing interference by applying a technology related to the NR-U system that enables autonomous distributed interference-adjustment based on LBT.

However, the local 5G frequency is allocated as a normal licensed band depending on countries or regions, and thus, it is not preferable to always apply the technology related to the NR-U system.

The invention has been made in view of the circumstances described above, and an object thereof is to allow a plurality of systems to coexist by applying a technology for an unlicensed band in NR, in accordance with a condition.

Means for Solving Problem

According to the disclosed technology, a terminal including: a reception unit configured to receive a specific information element from a base station through system information or dedicated signaling; and a control unit configured to apply a technology for an unlicensed frequency band to a target range of the specific information element in a case where the specific information element is received, wherein the control unit executes at least listen before talk (LBT) of the technology for the unlicensed frequency band is provided.

Effect of the Invention

According to the disclosed technology, a technology for allowing a plurality of systems to coexist by applying a technology for an unlicensed band in NR, in accordance with a condition, is provided.

MODE(S) FOR CARRYING OUT THE INVENTION

Hereinafter, an embodiment of the invention will be described with reference to the drawings. Note that, the embodiment described below is an example, and an embodiment to which the invention is applied is not limited to the following embodiment.

In the operation of a radio communication system of the embodiment of the invention, the existing technology is suitably used. However, the existing technology, for example, is the existing LTE, but is not limited to the existing LTE. In addition, the term "LTE" used herein has a broad meaning including LTE-advanced and a scheme subsequent to the LTE-advanced (for example, NR), unless otherwise noted.

In addition, in the embodiment of the invention described below, terms such as a synchronization signal (SS), a primary SS (PSS), a secondary SS (SSS), a physical broadcast channel (PBCH), a physical random access channel (PRACH), a physical downlink control channel (PDCCH), a physical downlink shared channel (PDSCH), a physical uplink control channel (PUCCH), a physical uplink shared channel (PUSCH), and the like, which are used in the existing LTE, are used. This is for convenience of description, and signals, functions, and the like similar to the above may be referred to by other names. In addition, the terms in NR correspond to NR-SS, NR-PSS, NR-SSS, NR-PBCH, NR-PRACH, and the like. However, even in the case of a signal that is used in NR, it is not necessary to specify the signal with "NR-".

In addition, in the embodiment of the invention, a duplex may be a time division duplex (TDD), may be a frequency division duplex (FDD), or may be other schemes (for example, a flexible duplex or the like).

In addition, in an embodiment of the present invention, "configuring" a radio parameter or the like may be pre-configuring a predetermined value, or may be configuring a radio parameter that is indicated by a base station 10 or a terminal 20.

Figure 1:
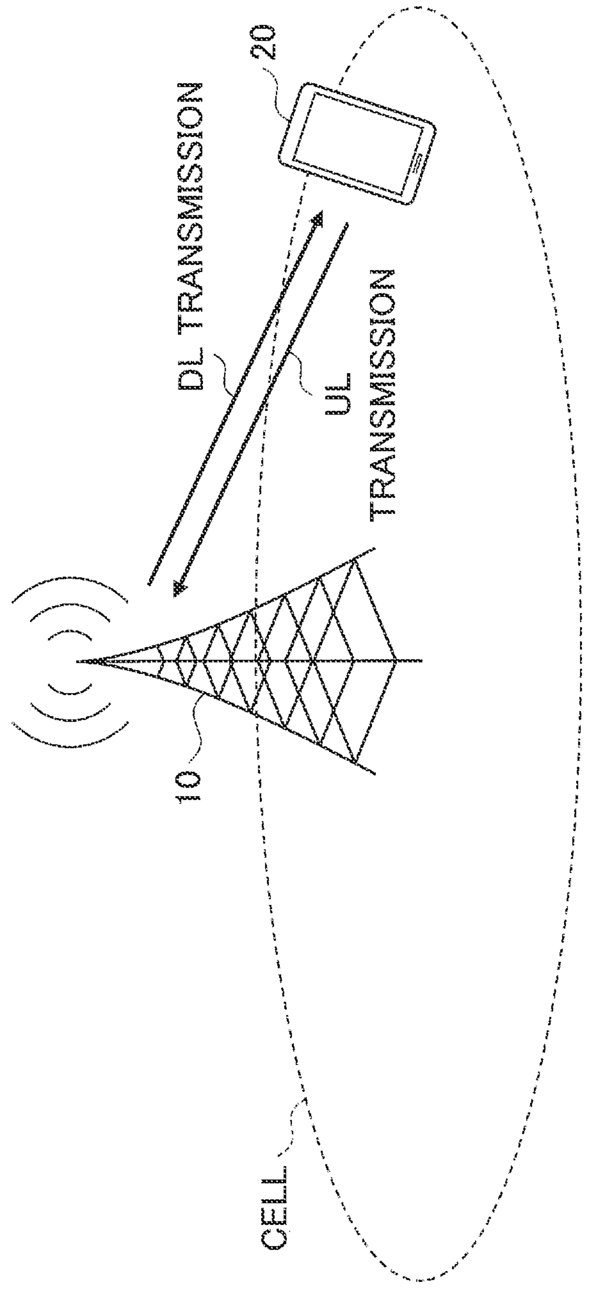
FIG. 1 is a diagram illustrating a configuration example of a radio communication system in an embodiment of the invention.

FIG. 1 is a diagram illustrating a configuration example of a radio communication system in the embodiment of the invention. As illustrated in FIG. 1, the radio communication system includes a base station 10 and a terminal 20. In FIG. 1, one base station 10 and one terminal 20 are illustrated, but this is an example, and a plurality of base stations 10 and a plurality of terminals 20 may be provided. Note that, the terminal 20 may be referred to as "user equipment". In addition, the radio communication system in this embodiment may be referred to as an NR-U system.

The base station 10 is a communication device that provides one or more cells and performs radio communication with respect to the terminal 20. A physical resource of a radio signal is defined by a time domain and a frequency domain, the time domain may be defined by a slot or an OFDM symbol, and the frequency domain may be defined by a subband, a subcarrier, or a resource block.

As illustrated in FIG. 1, the base station 10 transmits control information or data to the terminal 20 by downlink (DL), and receives control information or data from the terminal 20 by an uplink (UL). Both of the base station 10 and the terminal 20 are capable of performing transmission and reception with respect to the signal by using beam forming. In addition, both of the base station 10 and the terminal 20 are also capable of applying communication according to multiple input multiple output (MIMO) to DL or UL. In addition, both of the base station 10 and the terminal 20 may perform communication through a secondary cell (SCell) and a primary cell (PCell) according to carrier aggregation (CA).

The terminal 20 is a communication device having a radio communication function of a smart phone, a mobile phone, a tablet, a wearable terminal, a communication module for machine-to-machine (M2M), and the like. As illustrated in FIG. 1, in the terminal 20, the control information or the data is received from the base station 10 by DL, and the control information or the data is transmitted to the base station 10 by UL, and thus, various communication services to be provided by the radio communication system are used.

Figure 2:
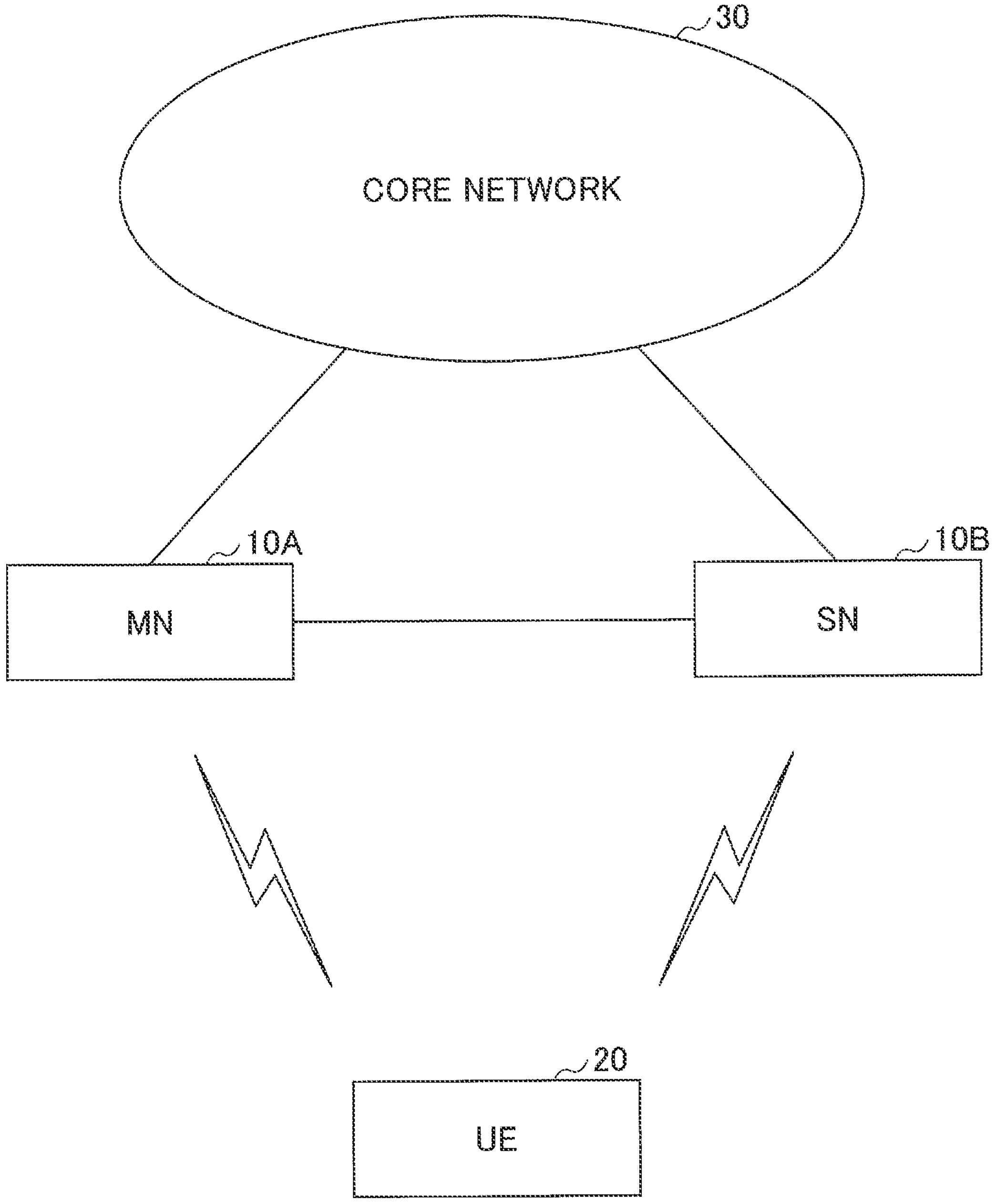
FIG. 2 is a diagram illustrating a radio communication system in the embodiment of the invention.

FIG. 2 is a diagram illustrating the radio communication system in an embodiment of the invention. FIG. 2 illustrates a configuration example of the radio communication system in a case where NR-dual connectivity (NR-DC) is executed. As illustrated in FIG. 2, a base station 10A that is a master node (MN) and a base station 10B that is a secondary node (SN) are provided. Each of the base station 10A and the base station 10B is connected to a core network 30. The terminal 20 performs communication with both of the base station 10A and the base station 10B.

A cell group provided by the base station 10A that is MN is referred to as a master cell group (MCG), and a cell group provided by the base station 10B that is SN is referred to as a secondary cell group (SCG). The following operation may be performed by any configuration of FIG. 1 and FIG. 2.

In a radio communication system of an embodiment of the present invention, LBT described above is executed. In a case where an LBT result is idle (in a case where LBT is successful), the base station 10 or the terminal 20 acquires a channel occupancy (CO), and performs transmission, and in a case where the LBT result is busy (in a case where LBT is failed, also referred to as LBT-busy), the base station 10 or the terminal 20 does not perform the transmission.

The radio communication system in an embodiment of the present invention may perform a carrier aggregation (CA) operation using an unlicensed CC and a licensed CC, may perform a dual connectivity (DC) operation using the unlicensed CC and the licensed CC, or may perform a standalone (SA) operation using only the unlicensed CC. CA, DC, or SA may be performed by any one system of NR and LTE. DC may be performed by at least two systems of NR, LTE, and other systems.

The terminal 20 detects transmission burst from the base station 10, and may assume the presence of a signal in PDCCH or a group common (GC)-PDCCH (for example, a reference signal (RS) such as a demodulation reference signal (DMRS)).

The base station 10 may transmit a specific PDCCH (PDCCH or GC-PDCCH) including a specific DMRS for indicating CO start, at the time of base-station-apparatus-triggered CO start. At least one of the specific PDCCH and the specific DMRS may be referred to as a CO start indication signal. The base station 10, for example, transmits the CO start indication signal to one or more terminals 20, and in a case where the specific DMRS is detected, the terminal 20 is capable of recognizing CO.

Here, the features of the terminal 20 according to an NR-U technology in Rel-16 will be described in 1) to 3) described below.

1) Functions for Fair and Efficient Coexistence Between Systems

UL-LBT (Including Indication of LBT Type and Priority Class)

Dynamic PDCCH Monitoring Operation based on Indication of CO Detection and CO Time Frequency Structure Mapping Expansion of PDSCH Type B for Efficiently Supporting Transmission Starting from Middle of Slot HARQ Function Expansion such as HARQ-ACK Feedback per PDSCH Group Unit or Multi-TTI Grant Configured Grant (CG) Function Expansion such as Uplink Control Information (UCI) Transmission including CO Information and HARQ-ACK Indication according to Downlink Feedback Information (DFI)

Expansion of Synchronization Signal/Physical Broadcast Channel Block (SS/PBCH Block: SSB) Transmission Candidate Position and Radio Link Monitoring (RLM)/Radio Resource Management (RRM) of Discovery Reference Signal (DRS) including Transmission Timing Shift Received Signal Strength Indicator (RSSI)/CO Measurement for Detecting Hidden Terminal 2) Functions for Satisfying Occupied Channel Bandwidth (OCB) Requirement (Transmission via 80% or more of System Band)

Interlace Type PUSCH Resource Allocation

Extended PUCCH Format corresponding to Interlace Type

PRACH Having Expanded Transmission Bandwidth

3) Functions for Using Band Wider than LBT Bandwidth of 20 MHz as One Carrier (Cell)

Expansion of CORESET and Search Space for Distributed Arrangement of Control Resource Set (CORESET) Distributed in Plurality of LBT Bands Indication of Frequency Domain Configuration of CO According to Group Common-PDCCH (GC-PDCCH)

Figure 3:
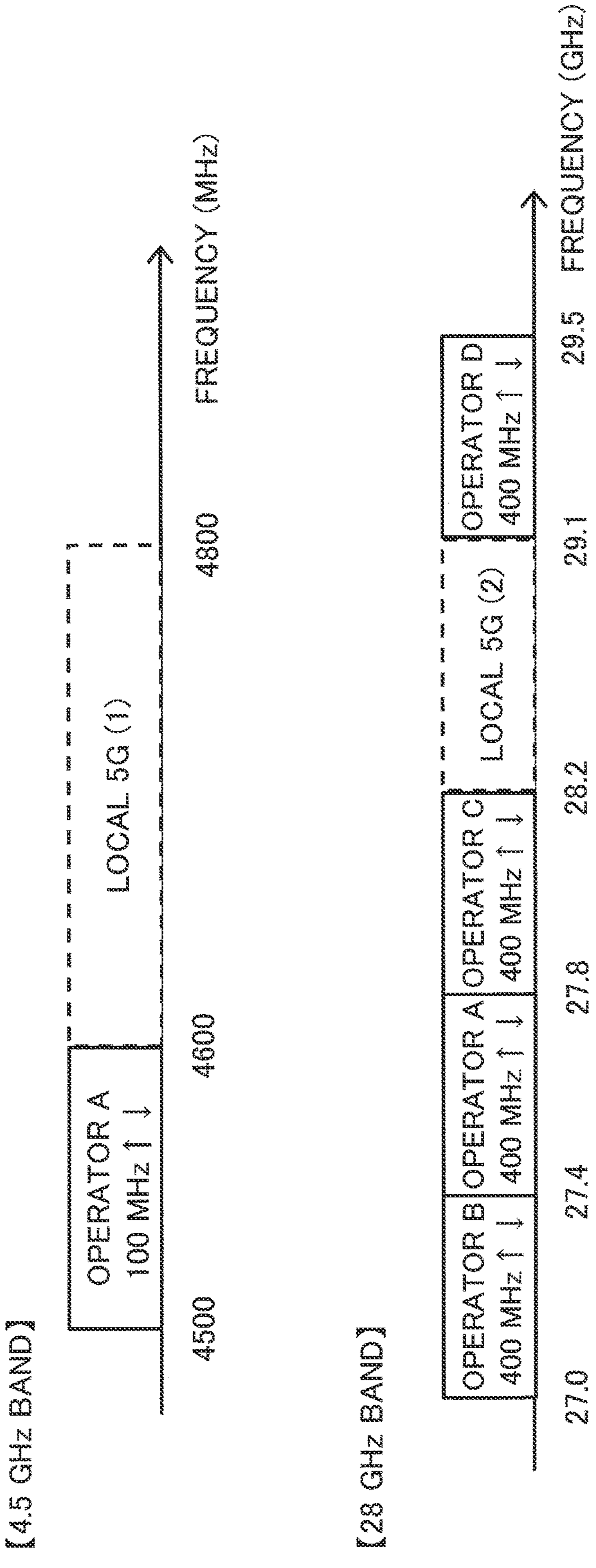
FIG. 3 is a diagram illustrating an allocation example of a local 5G frequency.

Partial Interlace Allocation for Performing Interlace Allocation Only in Part of LBT Band FIG. 3 is a diagram illustrating an allocation example of a local 5G frequency. As illustrated in FIG. 3, a frequency is allocated to an operator A, an operator B, an operator C, and an operator D. For example, in a 4.5 GHz band, the local 5G frequency that is shared by a plurality of licensees may be allocated to a range of 4600 MHz to 4800 MHz or at least a part thereof. In addition, for example, in a 28 GHz band, the local 5G frequency may be allocated to a range of 28.2 GHz to 29.1 GHz or at least a part thereof.

Figure 4:
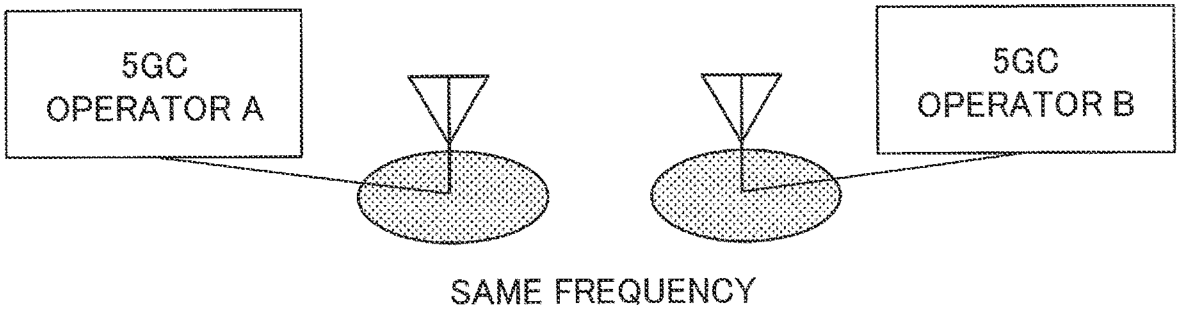
FIG. 4 is a diagram illustrating an example in which the local 5G frequency is operated.

FIG. 4 is a diagram illustrating an example in which the local 5G frequency is operated. As illustrated in FIG. 4, communication is executed by the operator A for operating a 5G core network (5GC) and the operator B for operating another 5GC with the same frequency. That is, the local 5G frequency is a part of a 5G frequency to be allocated to the plurality of licensees in a unit of area or in a unit of base station, for each country or region.

In a case where the local 5G frequency is operated, the same frequency is used by the plurality of licensees, and thus, interference avoidance measures such as area adjustment may be required. For example, in a region or the like in which buildings or factories are closely located, complicated interference adjustment is required, and thus, convenience or coverage may be degraded.

On the other hand, in 3GPP, an NR-U technology for an unlicensed frequency band is specified in Rel-16 NR. For example, autonomous distributed interference adjustment based on LBT may be enabled by the NR-U technology. Even in a case where the complicated area adjustment is not performed, a plurality of systems can be mixed in the same frequency band. However, in Rel-16 NR-U, an application target frequency is limited to a 5 GHz band and a 6 GHz band. In addition, LTE-LAA is defined to be applicable only to a band 46 included in the 5 GHz band according to the 3GPP specifications. Therefore, there are considerations about not applying NR-U or LTE-LAA in the local 5G frequency.

In a case where the NR-U technology can be applied in the local 5G frequency, it is assumed that a private network can be constructed even in the region in which the buildings or the factories are closely located, without performing the complicated area adjustment. For this reason, it is necessary to enable the NR-U technology to be applied in the local 5G frequency. However, the local 5G frequency is allocated as a normal licensed band depending on the countries or the regions, and thus, it is not preferable to always apply the NR-U technology to the licensed band.

Therefore, it is possible to achieve system coexistence based on the NR-U technology in a specific scenario such as the local 5G frequency, by expanding the applicable frequency band of the NR-U technology, and by enabling configuration of presence or absence of application of NR-U technology.

Figure 5:
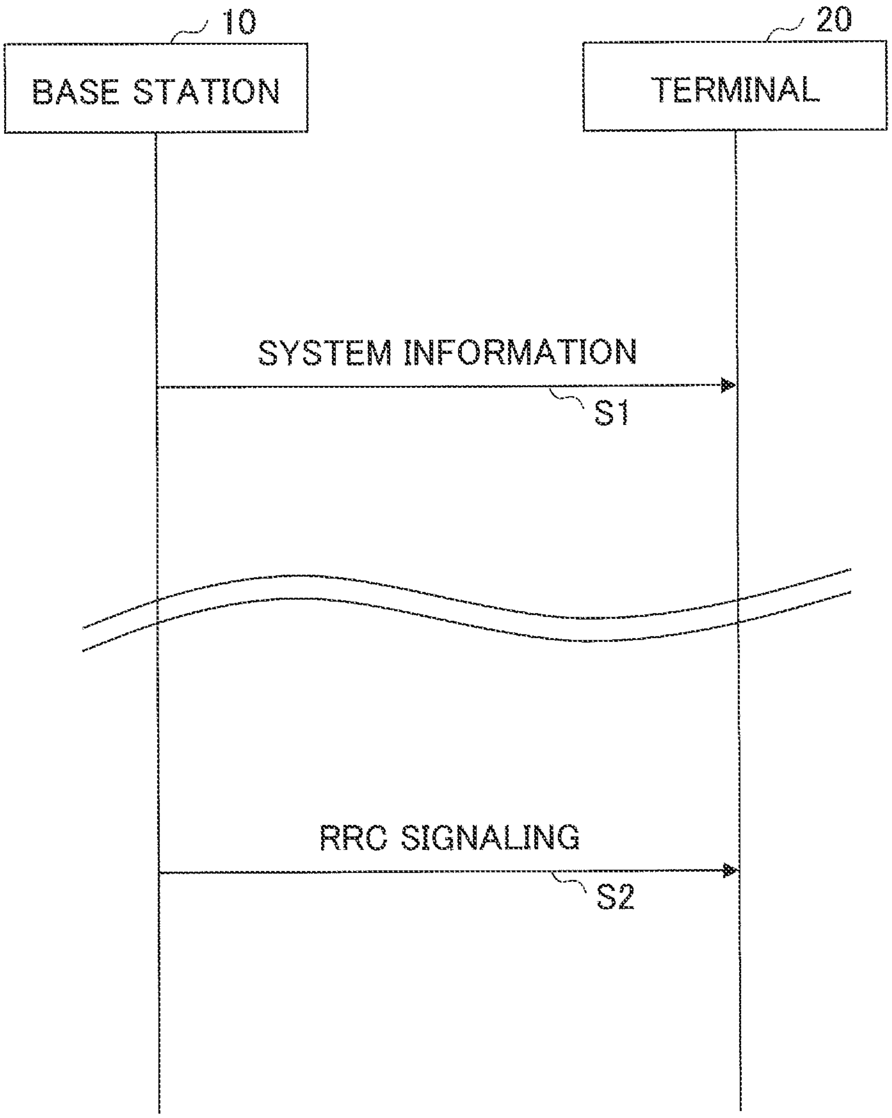
FIG. 5 is a sequence diagram illustrating signaling in the embodiment of the invention.

FIG. 5 is a sequence diagram illustrating signaling in an embodiment of the invention. As illustrated in FIG. 5, in step S1, the base station 10 may transmit system information including a specific information element (IE) to the terminal 20.

Alternatively, in step S2, the base station 10 may individually transmit radio resource control (RRC) signaling including the specific IE to the terminal 20. Either step S1 or step S2 may be executed, or the execution order may be reversed. In the specific IE, for example, a new IE is added to at least one of a system information block 1 (SIB1), other SIBs, servingCellConfig, MeasObjectNR, and the like, and the presence or absence of application of the NR-U technology is recognized by the terminal 20, in accordance with the presence or absence of IE. An operation in a case where the terminal 20 receives the specific IE in step S1 or step S2, is illustrated in FIG. 6.

Figure 6:
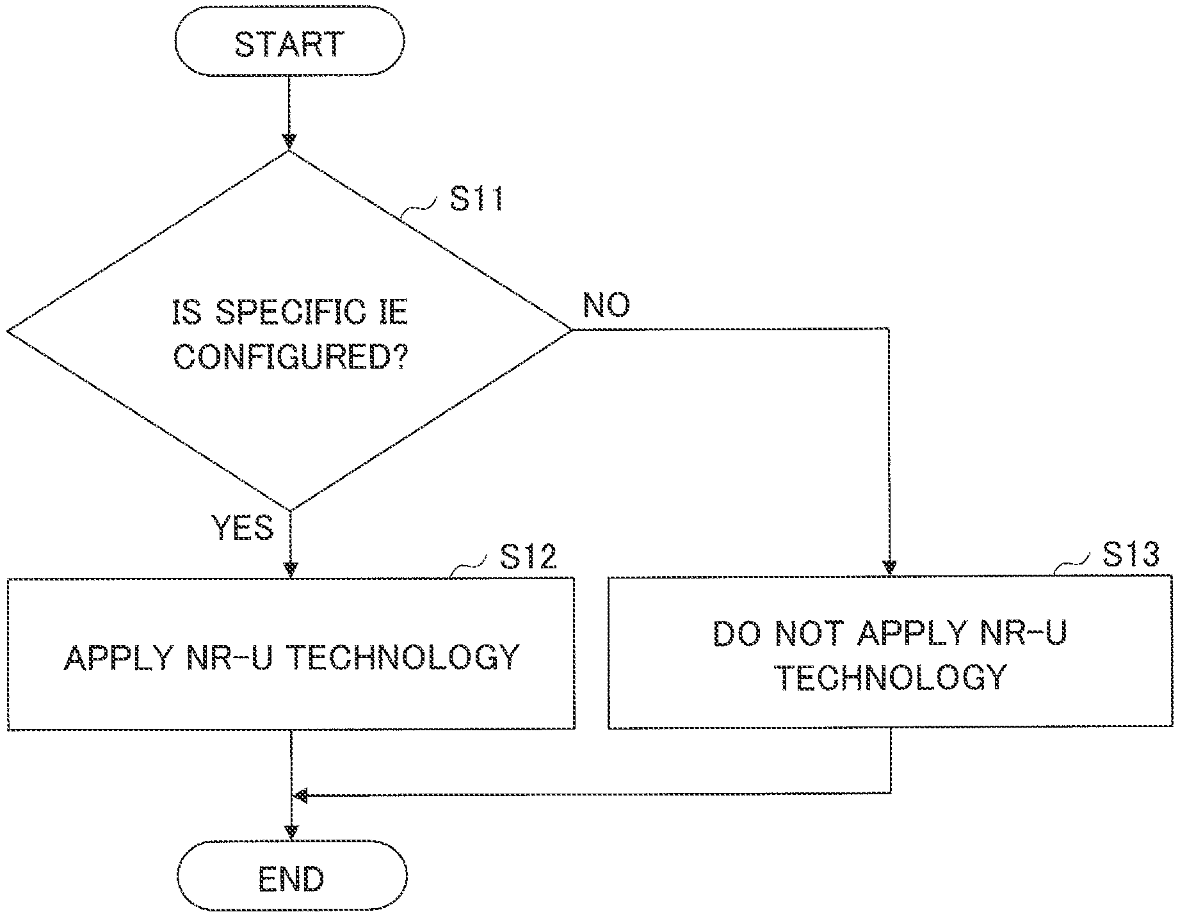
FIG. 6 is a flowchart for illustrating an operation of a terminal 20 in the embodiment of the invention.

FIG. 6 is a flowchart illustrating the operation of the terminal 20 in an embodiment of the invention. In step S11, the terminal 20 determines whether or not the specific IE is configured. In step S1 or step S2 of FIG. 5, in a case where the specific IE is received from the base station 10, and the specific IE is configured (YES of S11), the flow proceeds to step S12, and in a case where the specific IE is not configured (NO of S11), the flow proceeds to step S13. In step S12, the terminal 20 applies the NR-U technology. A target range to which the NR-U technology is applied may be configured for each band, each cell, or each frequency. On the other hand, in step S13, the terminal 20 does not apply the NR-U technology.

As illustrated in FIG. 5 and FIG. 6, the presence or absence of application of the NR-U technology is indicated to the terminal 20 via the system information or the RRC signaling, without being associated with the band in advance.

In step S11 of FIG. 6, in a case where the specific IE is configured, the terminal 20 may apply assumption, which is the same as the assumption of the NR-U technology that is applied to 5 GHz/6 GHz, to the target range of the specific IE. Therefore, with respect to an SSB candidate position, subcarrier spacing (SCS), an LBT bandwidth, and the like, it is possible to collectively apply the same assumption as that of the NR-U technology in 5 GHz/6 GHz.

In addition, in step S11 of FIG. 6, in a case where the specific IE is configured, the terminal 20 may apply only a part of the assumption of the NR-U technology in 5 GHz/6 GHz to the target range of the specific IE. For example, a function (group) such as only UL-LBT or only CO indication via GC-PDCCH, which is defined in advance by technical specifications, may be applied to the target range of the specific IE.

Unlike 5 GHz/6 GHz, it is not necessary to coexist with a wireless local area network (wireless LAN) or to satisfy regulations for an unlicensed band (for example, OCB requirements or the like), and thus, it is not necessary to apply all of the NR-U technology. It is possible to reuse the existing operation in the target range by applying only a part of the assumption. The base station 10 may instruct the terminal 20 to independently apply the configuration of the NR-U technology to each function, may instruct the terminal 20 to collectively apply the configuration of the NR-U technology to a plurality of functions, or may perform instruction to the terminal 20 by combining an independent instruction for each function and an instruction for a plurality of functions.

In a case where only a part of the assumption of the NR-U technology in 5 GHz/6 GHz is applied to the target range of the specific IE in a band other than the 5 GHz/6 GHz band of a frequency range 1 (FR1) (for example, 4.6 GHz to 4.8 GHz, and 3.7 GHz to 3.8 GHz), the configuration of the NR-U technology may be independently applied for each of the following items a) to k). Note that, any one or a plurality of the following items a) to k) need not be independently applied.

a) The terminal 20 may reuse the existing assumption of the band as shown in Table 1, with respect to the SSB transmission candidate positions in a slot and with respect to the default assumption for the SCS of SSB.

TABLE 1

| NR operating band | SS Block SCS | SS Block pattern[1] | Range of GSCN (First-<Step size>-Last) |
|---|---|---|---|
| n1 | 15 kHz | Case A | 5279-<1>-5419 |
| n77 | 30 kHz | Case C | 7711-<1>-8329 |
| n78 | 30 kHz | Case C | 7711-<1>-8051 |
| n79 | 30 kHz | Case C | 8480-<16>-8880 |

As shown in Table 1, SCS of SSB, SSB pattern, a range of a global synchronization raster channel (GSCN), and the like may be reused.

b) The terminal 20 may expand the SSB transmission candidate position to all slots in a half frame of 5 ms, and may use a part of a PBCH payload in order to derive an SSB position index, as with the NR-U technology. For example, the terminal 20 may assume a DRS transmission window of maximum 5 ms, and may perform frame synchronization by acquiring the SSB position index from a PBCH-DMRS sequence for 3 least significant bits and from the PBCH payload for 1 or 2 most significant bits. In addition, for example, in a case where a DRS transmission window period is configured by higher layer signaling, the terminal 20 may assume the DRS transmission window period.

c) The terminal 20 may assume a configuration table for the NR-U technology as a configuration table for CORESET #0 and a search space #0. For example, the terminal 20 may monitor monitoring occasion (MO) associated with the SSB candidate position that is QCL, in addition to PDCCH-MO associated with the detected SSB.

d) The terminal 20 may assume a PRACH configuration table for the NR-U technology as a PRACH configuration table.

e) The terminal 20 may assume that a random access response (RAR) window size is equal to or greater than 10 ms.

f) The terminal 20 may assume that the contents of RAR-UL grant is the same as those for the NR-U technology.

g) The terminal 20 may assume that the table of a default PDSCH mapping type A is the same as that for the NR-U technology.

h) The terminal 20 may assume that the DCI format to be monitored is as configured by search space configuration. For example, it may be possible to configure whether the DCI format to be monitored is a DCI format for the NR-U technology (for example, a DCI format including an LBT type field and a priority class field) or another DCI format, according to the search space configuration.

i) The terminal 20 may assume that whether CO configuration information or LBT bandwidth information for the NR-U technology is included or not included in the contents of GC-PDCCH is configured by the higher layer signaling such as SlotFormatCombinationsPerCell. For example, it may be possible to configure whether GC-PDCCH contents for the NR-U technology are included or not included, and to configure which DCI bit position to include the GC-PDCCH contents, by the higher layer signaling.

j) The terminal 20 may assume that, with respect to the PUCCH format, whether ePF0/1/2/3 for the NR-U technology or normal PF0/1/2/3/4 is used, is configured by the higher layer signaling such as a PUCCH configuration.

k) The terminal 20 may assume that in RLM, an operation for the NR-U technology, that is, an operation corresponding to a sample in which RLM-RS is determined to be not transmitted due to LBT failure, is applied.

In addition, in a case where the NR-U technology is applied, the terminal 20 may assume that the UL LBT bandwidth is an active UL-BWP bandwidth or an LBT bandwidth configured by the base station 10. For example, the terminal 20 may execute UL-LBT by assuming the active UL-BWP bandwidth as a UL-LBT bandwidth. In addition, for example, the configuration related to the LBT bandwidth may be indicated, to the terminal 20, by the base station 10 via the higher layer signaling, and the terminal 20 may execute UL LBT by using the LBT bandwidth that is indicated by the configuration.

In a case where the NR-U technology is applied in FR2 (for example, 28.2 GHz to 29.1 GHz), the base station 10 may indicate, to the terminal 20, information related to a quasi co-location (QCL) between candidate positions via a master information block (MIB) or SIB1, without increasing the maximum number of SSB transmission candidate positions.

That is, a plurality of SSB transmission candidate positions may be QCL, or synchronization may be executed based on the QCL relationship. Further, any one or a plurality of the following items l) to o) may be applied.

l) The terminal 20 may reuse the existing assumption of the band of FR2, with respect to the SSB transmission candidate positions in a slot or with respect to the default assumption for the SCS of SSB.

m) The terminal 20 may assume that the number of SSB transmission candidate positions is up to 64 without expansion.

n) The terminal 20 may receive information for deriving the QCL relationship between the SSB transmission candidate positions by using a reservation entry of the configuration table of the search space #0. In addition, for example, the information for deriving the QCL relationship between the SSB transmission candidate positions may be indicated by SIB1.

o) The terminal 20 may perform the same assumption as that of the case of applying the NR-U technology to FR1.

Note that, the terminal 20 may report, to the base station 10, whether or not the NR-U technology can be applied in a part of a frequency band, as UE capability. In addition, the terminal 20 may report, to the base station 10, whether or not the NR-U technology can be applied for each frequency band, as the UE capability, or may report, to the base station 10, whether or not the NR-U technology can be applied regardless of the frequency band, as the UE capability. The UE capability may be defined by being associated with whether or not to support the unlicensed band, or may be defined independently. For example, the terminal 20 corresponding to the unlicensed band may have to have the UE capability for enabling the NR-U technology to be applied.

According to the embodiments described above, the terminal 20 can apply the NR-U technology, as necessary, in the local 5G frequency included in the licensed frequency band.

That is, in the radio communication system, it is possible to allow the plurality of systems to coexist by applying a technology for an unlicensed band in NR, in accordance with a condition.

(Apparatus Configuration)

Next, a function configuration example of the base station 10 and the terminal 20 that execute the processing and the operation described above will be described. The base station 10 and the terminal 20 have functions for implementing the example described above. However, each of the base station 10 and the terminal 20 may have only a part of the functions in the example.

<Base Station 10>

Figure 7:
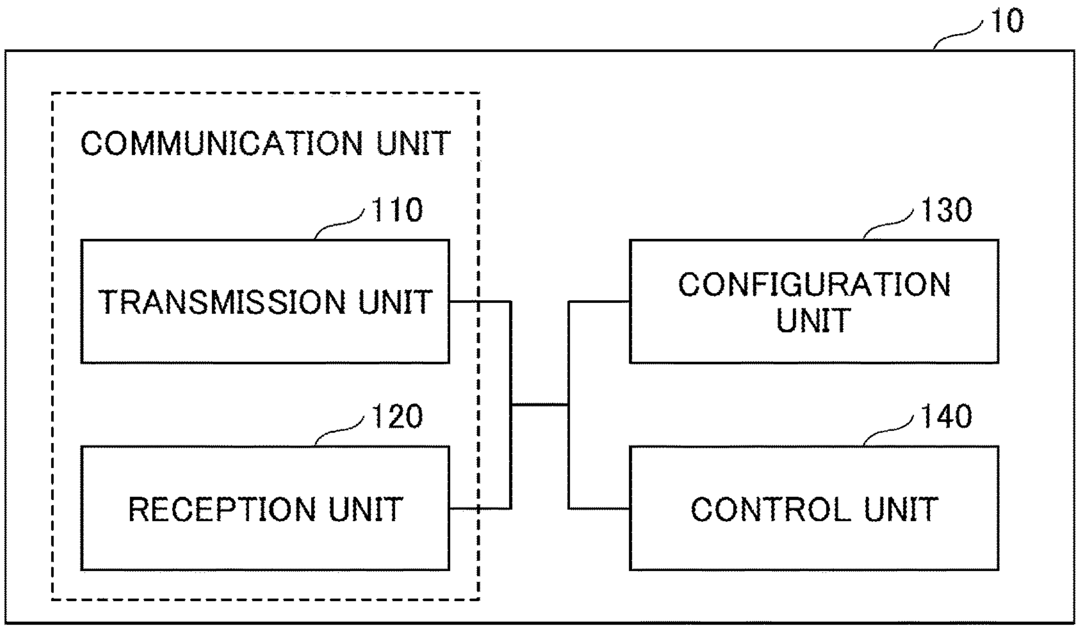
FIG. 7 is a diagram illustrating an example of a function configuration of a base station 10 in the embodiment of the invention.

FIG. 7 is a diagram illustrating an example of a function configuration of the base station 10 in the embodiment of the invention. As illustrated in FIG. 7, the base station 10 includes a transmission unit 110, a reception unit 120, a configuration unit 130, and a control unit 140. The function configuration illustrated in FIG. 7 is merely an example. Any names may be used for functional segments and functional parts, insofar as the operation according to the embodiment of the invention can be executed.

The transmission unit 110 has a function of generating a signal that is transmitted to the terminal 20 side and of transmitting the signal over the radio. In addition, the transmission unit 110 transmits a message between network nodes to the other network node. The reception unit 120 has a function of receiving various signals that are transmitted from the terminal 20 over the radio and of acquiring, for example, information of a higher layer from the received signals. In addition, the transmission unit 110 has a function of transmitting NR-PSS, NR-SSS, NR-PBCH, a DL/UL control signal, a reference signal, and the like to the terminal 20. In addition, the reception unit 120 receives the message between the network nodes from the other network node. In addition, the transmission unit 110 transmits information indicating whether or not the NR-U technology is applied, to the terminal 20. Note that, the transmission unit 110 and the reception unit 120 may be referred to as a communication device.

The configuration unit 130 stores configuration information that is pre-configured, and various configuration information items that are transmitted to the terminal 20 in a storage device, and as necessary, reads out the configuration information from the storage device. The contents of the configuration information, for example, are information necessary for the NR-U technology, and the like.

As described in the example, the control unit 140 performs control relevant to the NR-U technology. A functional part relevant to the signal transmission in the control unit 140 may be included in the transmission unit 110, and a functional part relevant to the signal reception in the control unit 140 may be included in the reception unit 120.

<Terminal 20>

Figure 8:
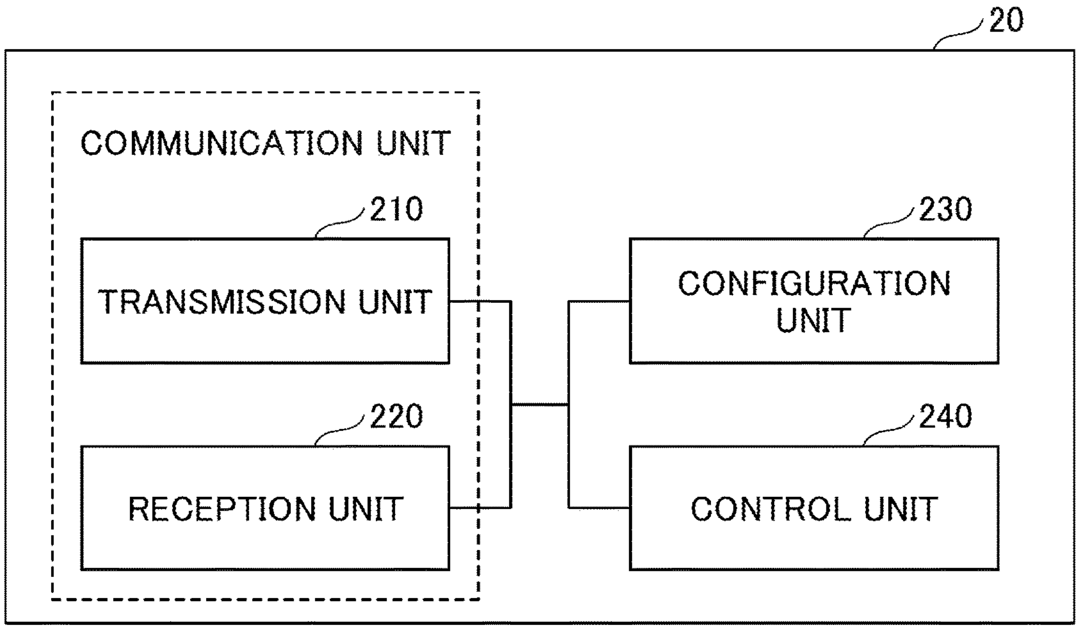
FIG. 8 is a diagram illustrating an example of a function configuration of the terminal 20 in the embodiment of the invention.

FIG. 8 is a diagram illustrating an example of a function configuration of the terminal 20 in the embodiment of the invention. As illustrated in FIG. 8, the terminal 20 includes a transmission unit 210, a reception unit 220, a configuration unit 230, and a control unit 240. The function configuration illustrated in FIG. 8 is merely an example. Any names may be used for functional segments and functional parts, insofar as the operation according to the embodiment of the invention can be executed.

The transmission unit 210 has a function of preparing a transmission signal from transmission data and of transmitting the transmission signal over the radio. The reception unit 220 receives various signals over the radio and acquires a higher layer signal from the received signal of a physical layer. In addition, the reception unit 220 has a function of receiving NR-PSS, NR-SSS, NR-PBCH, a DL/UL/SL control signal, and the like, which are transmitted from the base station 10. In addition, for example, the transmission unit 210 transmits a physical sidelink control channel (PSCCH), a physical sidelink shared channel (PSSCH), a physical sidelink discovery channel (PSDCH), a physical sidelink broadcast channel (PSBCH), and the like to the other terminal 20, as D2D communication, and the reception unit 220 receives PSCCH, PSSCH, PSDCH, PSBCH, or the like from the other terminal 20. In addition, a function of executing LBT is a function relevant to transmission, and thus, is provided in the transmission unit 210. Alternatively, the function of executing LBT may be provided in the reception unit 220. Note that, the transmission unit 210 and the reception unit 220 may referred to as a communication device.

The configuration unit 230 stores various configuration information items that are received from the base station 10 or the terminal 20 by the reception unit 220, in the storage device, and as necessary, reads out the configuration information from the storage device. In addition, the configuration unit 230 also stores the configuration information that is pre-configured. The contents of the configuration information, for example, are the information necessary for the NR-U technology, and the like.

As described in the example, the control unit 240 performs the control relevant to the NR-U technology in the terminal 20. A functional part relevant to the signal transmission in the control unit 240 may be included in the transmission unit 210, and a functional part relevant to the signal reception in the control unit 240 may be included in the reception unit 220.

(Hardware Configuration)

The block diagrams (FIG. 7 and FIG. 8) used in the description of the embodiment described above illustrate the block of functional unit. Such function blocks (configuration parts) are attained by at least one arbitrary combination of hardware and software. In addition, an attainment method of each of the function blocks is not particularly limited. That is, each of the function blocks may be attained by using one apparatus that is physically or logically coupled, by directly or indirectly (for example, in a wired manner, over the radio, or the like) connecting two or more apparatuses that are physically or logically separated and by using such a plurality of apparatuses. The function block may be attained by combining one apparatus described above or a plurality of apparatuses described above with software.

The function includes determining, determining, judging, calculating, computing, processing, deriving, investigating, looking up, ascertaining, receiving, transmitting, output, accessing, resolving, selecting, choosing, establishing, comparing, assuming, expecting, presuming, broadcasting, notifying, communicating, forwarding, configuring, reconfiguring, allocating (mapping), assigning, and the like, but is not limited thereto. For example, a function block (a configuration part) that functions transmission is referred to as the transmission unit or the transmitter. As described above, the attainment method thereof is not particularly limited.

Figure 9:
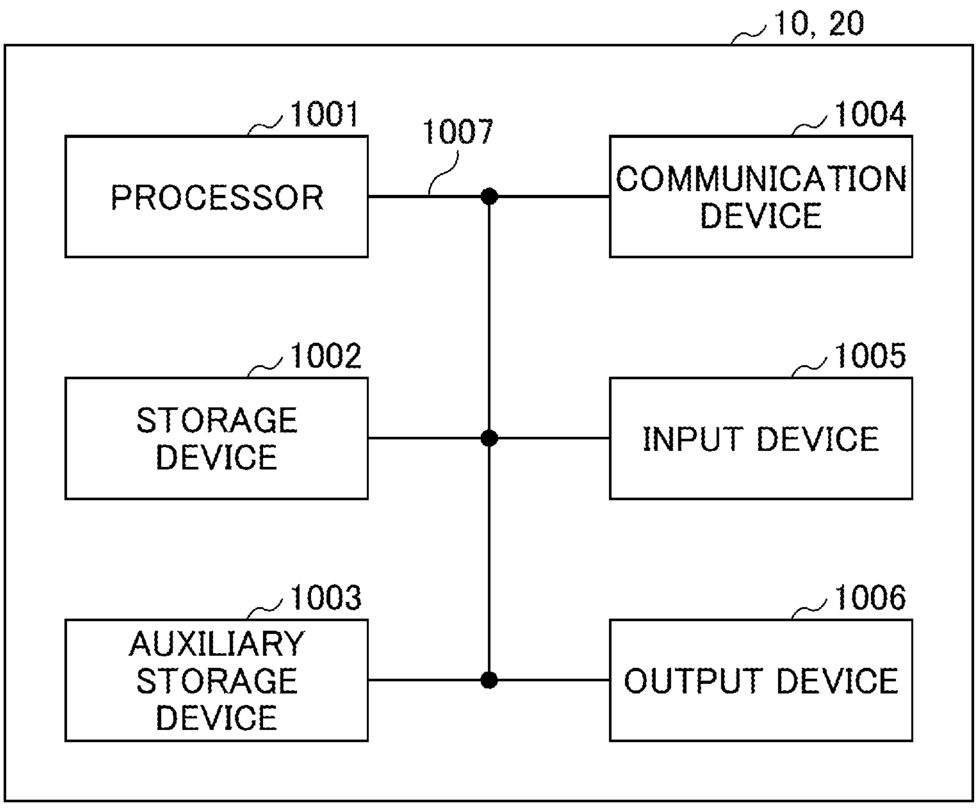
FIG. 9 is a diagram illustrating an example of a hardware configuration of the base station 10 or the terminal 20 in the embodiment of the invention.

For example, the base station 10, the terminal 20, and the like in one embodiment of this disclosure may function as a computer for performing the processing of a radio communication method of this disclosure. FIG. 9 is a diagram illustrating an example of a hardware configuration of the base station 10 and the terminal 20 according to one embodiment of this disclosure. The base station 10 and the terminal 20 described above may be physically configured as a computer apparatus including a processor 1001, a storage device 1002, an auxiliary storage device 1003, a communication device 1004, an input device 1005, an output device 1006, a bus 1007, and the like.

Note that, in the following description, the word "apparatus" can be replaced with a circuit, a device, a unit, or the like. The hardware configuration of the base station 10 and the terminal 20 may be configured to include one or a plurality of apparatuses illustrated in the drawings, or may be configured not to include a part of the apparatuses.

Each function of the base station 10 and the terminal 20 is attained by reading predetermined software (a program) is read on hardware such as the processor 1001 and the storage device 1002 such that the processor 1001 performs an operation, and by controlling the communication of the communication device 1004 or by controlling at least one of reading and writing of data in the storage device 1002 and the auxiliary storage device 1003.

The processor 1001, for example, controls the entire computer by operating an operating system. The processor 1001 may be configured by a central processing unit (CPU) including an interface with respect to the peripheral equipment, a control apparatus, an operation apparatus, a register, and the like. For example, the control unit 140, the control unit 240, or the like, described above, may be attained by the processor 1001.

In addition, the processor 1001 reads out a program (a program code), a software module, data, and the like to the storage device 1002 from at least one of the auxiliary storage device 1003 and the communication device 1004, and thus, executes various processings. A program for allowing a computer to execute at least a part of the operation described in the embodiment described above is used as the program. For example, the control unit 140 of the base station 10 illustrated in FIG. 7 may be attained by a control program that is stored in the storage device 1002 and is operated by the processor 1001. In addition, for example, the control unit 240 of the terminal 20 illustrated in FIG. 8 may be attained by a control program that is stored in the storage device 1002 and is operated by the processor 1001. It has been described that the various processings described above are executed by one processor 1001, but the processings may be simultaneously or sequentially executed by two or more processors 1001. The processor 1001 may be mounted on one or more chips. Note that, the program may be transmitted from a network through an electric communication line.

The storage device 1002 is a computer readable recording medium, and for example, may be configured of at least one of a read only memory (ROM), an erasable programmable ROM (EPROM), an electrically erasable programmable ROM (EEPROM), a random access memory (RAM), and the like. The storage device 1002 may be referred to as a register, a cache, a main memory (a main storage device), and the like. The storage device 1002 is capable of retaining a program (a program code) that can be executed in order to implement a communication method according to one embodiment of this disclosure, a software module, and the like.

The auxiliary storage device 1003 is a computer readable recording medium, and for example, may be configured of at least one of an optical disk such as a compact disc ROM (CD-ROM), a hard disk drive, a flexible disk, a magnetooptical disk (for example, a compact disc, a digital versatile disk, and a Blu-ray (Registered Trademark) disk), a smart card, a flash memory (for example, a card, a stick, a key drive), a floppy (Registered Trademark) disk, a magnetic strip, and the like. The recording medium described above, for example, may be a database including at least one of the storage device 1002 and the auxiliary storage device 1003, a server, and a suitable medium.

The communication device 1004 is hardware for performing communication with respect to the computer through at least one of a wire network and a radio network (a transmitting and receiving device), and for example, is also referred to as a network device, a network controller, a network card, a communication module, and the like. The communication device 1004, for example, may be configured by including a high frequency switch, a duplexer, a filter, a frequency synthesizer, and the like, in order to attain at least one of frequency division duplex (FDD) and time division duplex (TDD). For example, a transmitting and receiving antenna, an amplifier, a transmitting and reception unit, a transmission path interface, and the like may be attained by the communication device 1004. In the transmitting and receiving unit, the transmission unit and the reception unit are mounted by being physically or logically separated.

The input device 1005 is an input device for receiving input from the outside (for example, a keyboard, a mouse, a microphone, a switch, a button, a sensor, and the like). The output device 1006 is an output device for implementing output with respect to the outside (for example, a display, a speaker, an LED lamp, and the like). Note that, the input device 1005 and the output device 1006 may be integrally configured (for example, a touch panel).

In addition, each of the apparatuses such as the processor 1001 and the storage device 1002 may be connected by the bus 1007 for performing communication with respect to information. The bus 1007 may be configured by using a single bus, or may be configured by using buses different for each of the apparatuses.

In addition, the base station 10 and the terminal 20 may be configured by including hardware such as a microprocessor, a digital signal processor (DSP), an application specific integrated circuit (ASIC), a programmable logic device (PLD), and a field programmable gate array (FPGA), and a part or all of the respective function blocks may be attained by the hardware. For example, the processor 1001 may be mounted by using at least one of the hardwares.

Summary of Embodiment

As described above, according to the embodiment of the invention, a terminal including: a reception unit configured to receive a specific information element from a base station through system information or dedicated signaling; and a control unit configured to apply a technology for an unlicensed frequency band to a target range of the specific information element in a case where the specific information element is received, wherein the control unit executes at least listen before talk (LBT) of the technology for the unlicensed frequency band is provided.

According to an embodiment described above, the terminal 20 can apply the NR-U technology, as necessary, in the local 5G frequency included in the licensed frequency band. That is, in the radio communication system, it is possible to allow the plurality of systems to coexist by applying the technology for an unlicensed band in NR, in accordance with a condition.

The target range may be configured for each band, each cell, or each frequency included in the licensed frequency band. According to the configuration, the terminal 20 can apply the NR-U technology, as necessary, in the local 5G frequency included in the licensed frequency band.

The control unit may apply all or a part of the technology for the unlicensed frequency band to the target range of the specific information element. According to the configuration, the terminal 20 can apply the NR-U technology, as necessary, in the local 5G frequency included in the licensed frequency band.

The control unit may assume an active uplink bandwidth part (BWP) as an LBT bandwidth. According to this configuration, the terminal 20 can execute LBT in the local 5G frequency included in the licensed frequency band.

The reception unit may receive information related to a quasi co-location (QCL) between SS/PBCH block (SSB) transmission candidate positions from the base station, and in a case where the technology for the unlicensed frequency band is applied in a frequency range 2 (FR2), the control unit may execute synchronization based on the information related to QCL between the SSB transmission candidate positions, without expanding the maximum number of SSB transmission candidate positions. According to the above-described configuration, the terminal 20 can efficiently execute the synchronization in the local 5G frequency included in the licensed frequency band.

In addition, according to an embodiment of the invention, a communication method to be executed by a terminal, the communication method comprising: receiving a specific information element from a base station through system information or dedicated signaling; and applying a technology for an unlicensed frequency band to a target range of the specific information element in a case where the specific information element is received, wherein the applying includes executing at least listen before talk (LBT) of the technology for the unlicensed frequency band, is provided.

According to an embodiment described above, the terminal 20 can apply the NR-U technology, as necessary, in the local 5G frequency included in the licensed frequency band. That is, in a radio communication system, it is possible to allow the plurality of systems to coexist by applying the technology for the unlicensed band in NR, in accordance with a condition.

Supplement to Embodiment

As described above, embodiments of the invention have been described, but the disclosed invention is not limited to the above-described embodiments, and a person skilled in the art will understand various modification examples, correction examples, alternative examples, substitution examples, and the like. Specific numerical examples have been described in order to facilitate the understanding of the invention, but the numerical values are merely an example, and any appropriate values may be used, unless otherwise specified. The classification of the items in the above description is not essential to the invention, and the listings described in two or more items may be used by being combined, as necessary, or the listing described in one item may be applied to the listing described in another item (insofar as there is no contradiction). A boundary between the functional parts or the processing parts in the function block diagram does not necessarily correspond to a boundary between physical components. The operations of a plurality of functional parts may be physically performed by one component, or the operation of one functional part may be physically performed by a plurality of components. In a processing procedure described in the embodiment, a processing order may be changed, insofar as there is no contradiction. For the convenience of describing the processing, the base station 10 and the terminal 20 have been described by using a functional block diagram, but such an apparatus may be attained by hardware, software, or a combination thereof. Each of software that is operated by a processor of the base station 10 according to the embodiment of the invention and software that is operated by a processor of the terminal 20 according to the embodiment of the invention may be retained in a random access memory (RAM), a flash memory, a read only memory (ROM), an EPROM, an EEPROM, a register, a hard disk (HDD), a removable disk, a CD-ROM, a database, a server, and other suitable recording media.

In addition, the indication of the information is not limited to the aspect/embodiment described in this disclosure, and may be performed by using other methods. For example, the indication of the information may be implemented by physical layer signaling (for example, downlink control information (DCI) and uplink control information (UCI)), higher layer signaling (for example, radio resource control (RRC) signaling, medium access control (MAC) signaling, broadcast information (a master information block (MIB)), a system information block (SIB)), other signals, or a combination thereof. In addition, the RRC signaling may be referred to as an RRC message, and for example, may be an RRC connection setup message, an RRC connection reconfiguration message, and the like.

Each aspect/embodiments described in this disclosure may be applied to a system using long term evolution (LTE), LTE-advanced (LTE-A), SUPER 3G, IMT-advanced, a 4th generation mobile communication system (4G), a 5th generation mobile communication system (5G), future radio access (FRA), new radio (NR), W-CDMA (Registered Trademark), GSM (Registered Trademark), CDMA2000, an ultra mobile broadband (UMB), IEEE 802.11 (Wi-Fi (Registered Trademark)), IEEE 802.16 (WiMAX (Registered Trademark)), IEEE 802.20, an ultra-wideband (UWB), Bluetooth (Registered Trademark), and other suitable systems and a next-generation system that is expanded on the basis thereof. In addition, a combination of a plurality of systems (for example, a combination of at least one of LTE and LTE-A and 5G, and the like) may be applied.

In the processing procedure, the sequence, the flowchart, and the like of each aspect/embodiment described herein, the order may be changed, insofar as there is no contradiction. For example, in the method described in this disclosure, the elements of various steps are presented by using an exemplary order, but are not limited to the presented specific order.

Here, a specific operation that is performed by the base station 10 may be performed by an upper node, in accordance with a case. In a network provided with one or a plurality of network nodes including the base station 10, it is obvious that various operations that are performed in order for communication with respect to a terminal 20 can be performed by at least one of the base station 10 and network nodes other than the base station 10 (for example, MME, S-GW, or the like is considered as the network node, but the network node is not limited thereto). In the above description, a case is exemplified in which the number of network nodes other than the base station 10 is 1, but a plurality of other network nodes may be combined (for example, the MME and the S-GW).

The information, the signal, or the like described in this disclosure can be output to a lower layer (or the higher layer) from the higher layer (or the lower layer). The information, the signal, or the like may be input and output through a plurality of network nodes.

The information or the like that is input and output may be retained in a specific location (for example, a memory), or may be managed by using a management table. The information or the like that is input and output can be subjected to overwriting, updating, or editing. The information or the like that is output may be deleted. The information or the like that is input may be transmitted to the other apparatuses.

Determination in this disclosure may be performed by a value represented by 1 bit (0 or 1), may be performed by a truth-or-false value (Boolean: true or false), or may be performed by a numerical comparison (for example, a comparison with a predetermined value).

Regardless of whether the software is referred to as software, firmware, middleware, a microcode, and a hardware description language, or is referred to as other names, the software should be broadly interpreted to indicate a command, a command set, a code, a code segment, a program code, a program, a sub-program, a software module, an application, a software application, a software package, a routine, a sub-routine, an object, an executable file, an execution thread, a procedure, a function, and the like.

In addition, software, a command, information, and the like may be transmitted and received through a transmission medium. For example, in a case where the software is transmitted from a website, a server, or other remote sources by using at least one of a wire technology (a coaxial cable, an optical fiber cable, a twisted pair, a digital subscriber line (DSL), and the like) and a radio technology (an infrared ray, a microwave, and the like), at least one of the wire technology and the radio technology is included in the definition of the transmission medium.

The information, the signal, and the like described in this disclosure may be represented by using any of various different technologies. For example, the data, the command, the command, the information, the signal, the bit, the symbol, the chip, and the like that can be referred to through the entire description described above may be represented by a voltage, a current, an electromagnetic wave, a magnetic field or magnetic particles, an optical field or a photon, or an arbitrary combination thereof.

Note that, the terms described in this disclosure and the terms necessary for understanding this disclosure may be replaced with terms having the same or similar meaning. For example, at least one of the channel and the symbol may be a signal (signaling). In addition, the signal may be a message. In addition, a component carrier (CC) may be referred to as a carrier frequency, a cell, a frequency carrier, and the like.

The terms "system" and "network" used in this disclosure are interchangeably used.

In addition, the information, the parameter, and the like described in this disclosure may be represented by using an absolute value, may be represented by using a relative value from a predetermined value, or may be represented by using another corresponding information. For example, a radio resource may be indicated by an index.

The names used in the parameters described above are not a limited name in any respect. Further, expressions or the like using such parameters may be different from those explicitly disclosed in this disclosure. Various channels (for example, PUCCH, PDCCH, and the like) and information elements can be identified by any suitable name, and thus, various names that are allocated to such various channels and information elements are not a limited name in any respect.

In this disclosure, the terms "base station (BS)", "radio base station", "base station apparatus", "fixed station", "NodeB", "eNodeB (eNB)", "gNodeB (gNB)", "access point", "transmission point", "reception point", "transmission and reception point", "cell", "sector", "cell group", "carrier", "component carrier", and the like can be interchangeably used. The base station may be referred to by a term such as a macrocell, a small cell, a femtocell, and a picocell.

The base station is capable of accommodating one or a plurality of (for example, three) cells. In a case where the base station accommodates a plurality of cells, the entire coverage area of the base station can be classified into a plurality of small areas, and each of the small areas is capable of providing communication service by a base station sub-system (for example, an indoor type small base station (a remote radio head (RRH)). The term "cell" or "sector" indicates a part of the coverage area or the entire coverage area of at least one of the base station and the base station sub-system that perform the communication service in the coverage.

In this disclosure, the terms "mobile station (MS)", "user terminal", "user equipment (UE)", and "terminal" can be interchangeably used.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other suitable terms, by a person skilled in the art.

At least one of the base station and the mobile station may be referred to as a transmitting apparatus, a receiving apparatus, a communication device, and the like. Note that, at least one of the base station and the mobile station may be a device that is mounted on a mobile object, the mobile object itself, or the like. The mobile object may be a vehicle (for example, a car, an airplane, and the like), may be a mobile object that is moved in an unmanned state (for example, a drone, an autonomous driving car, and the like), or may be a (manned or unmanned) robot. Note that, at least one of the base station and the mobile station also includes an apparatus that is not necessarily moved at the time of a communication operation. For example, at least one of the base station and the mobile station may be an internet of things (IoT) device such as a sensor.

In addition, the base station in this disclosure may be replaced with the user terminal. For example, each aspect/embodiment of this disclosure may be applied to a configuration in which communication between the base station and the user terminal is replaced with communication in a plurality of terminals 20 (for example, may be referred to as device-to-device (D2D), vehicle-to-everything (V2X), and the like). In this case, the function of the base station 10 described above may be provided in the terminal 20. In addition, the words "up", "down", and the like may be replaced with words corresponding to the communication between the terminals (for example, "side"). For example, an up channel, a down channel, and the like may be replaced with a side channel.

Similarly, the user terminal in this disclosure may be replaced with the base station. In this case, the function of the user terminal described above may be provided in the base station.

The terms "determining" and "determining" used in this disclosure may involve diverse operations. "Determining" and "determining", for example, are capable of including "determining" and "determining" with respect to judging, calculating, computing, processing, deriving, investigating, looking up (search, inquiry) (for example, looking up in a table, a database, or another data structure), and ascertaining, and the like. In addition, "determining" and "determining" are capable of including "determining" and "determining" with respect to receiving (for example, receiving information), transmitting (for example, transmitting information), input, output, and accessing (for example, accessing data in a memory), and the like. In addition, "determining" and "determining" are capable of including "determining" and "determining" with respect to resolving, selecting, choosing, establishing, comparing, and the like. That is, "determining" and "determining" are capable of including "determining" and "determining" with respect to any operation. In addition, "determining (determining)" may be replaced with "assuming", "expecting", "considering", and the like.

The terms "connected" and "coupled", or any modification thereof indicate any direct or indirect connection or couple in two or more elements, and are capable of including a case where there are one or more intermediate elements between two elements that are "connected" or "coupled" to each other. The couple or connection between the elements may be physical couple or connection, may be logical couple or connection, or may be a combination thereof. For example, the "connection" may be replaced with "access". In the case of being used in this disclosure, it is possible to consider that two elements are "connected" or "coupled" to each other by using at least one of one or more electric wires, cables, and print electric connection, and as some non-limiting and non-inclusive examples, by using electromagnetic energy having a wavelength of a radio frequency domain, a microwave domain, and an optical (visible and invisible) domain, and the like.

The reference signal can also be abbreviated as RS, and may be referred to as pilot based on a standard to be applied.

The description "based on" that is used in this disclosure does not indicate "only based on", unless otherwise specified. In other words, the description "based on" indicates both "only based on" and "at least based on".

Any reference to elements using the designations "first," "second," and the like, used in this disclosure, does not generally limit the amount or the order of such elements. Such designations can be used in this disclosure as a convenient method for discriminating two or more elements. Therefore, a reference to a first element and a second element does not indicate that only two elements can be adopted or the first element necessarily precedes the second element in any manner.

"Means" in the configuration of each of the apparatuses described above may be replaced with "unit", "circuit", "device", and the like.

In this disclosure, in a case where "include", "including", and the modification thereof are used, such terms are intended to be inclusive, as with the term "comprising". Further, the term "or" that is used in this disclosure is not intended to be exclusive-OR.

A radio frame may be configured of one or a plurality of frames in a time domain. Each of one or a plurality of frames in the time domain may be referred to as a subframe. The subframe may be further configured of one or a plurality of slots in the time domain. The subframe may be a fixed time length (for example, 1 ms) that does not depend on numerology.

The numerology may be a communication parameter to be applied to at least one of the transmission and the reception of a certain signal or channel. The numerology, for example, may indicate at least one of subcarrier spacing (SCS), a bandwidth, a symbol length, a cyclic prefix length, a transmission time interval (TTI), the number of symbols per TTI, a radio frame configuration, specific filtering processing that is performed by the transceiver in a frequency domain, specific windowing processing that is performed by the transceiver in a time domain, and the like.

The slot may be configured of one or a plurality of symbols (an orthogonal frequency division multiplexing (OFDM) symbol, a single carrier frequency division multiple access (SC-FDMA) symbol, and the like) in a time domain. The slot may be time unit based on the numerology.

The slot may include a plurality of mini slots. Each of the mini slots may be configured of one or a plurality of symbols in the time domain. In addition, the mini slot may be referred to as a subslot. The mini slot may be configured of symbols of which the number is less than that of the slot. PDSCH (or PUSCH) to be transmitted in time unit greater than the mini slot may be referred to as a PDSCH (or PUSCH) mapping type A. PDSCH (or PUSCH) to be transmitted by using the mini slot may be referred to as a PDSCH (or PUSCH) mapping type B.

All of the radio frame, the subframe, the slot, the mini slot, and the symbol represent time unit at the time of transmitting a signal. Other designations respectively corresponding to the radio frame, the subframe, the slot, the mini slot, and the symbol may be used.

For example, one subframe may be referred to as a transmission time interval (TTI), a plurality of consecutive subframes may be referred to as TTI, or one slot or one mini slot may be referred to as TTI. That is, at least one of the subframe and TTI may be a subframe (1 ms) in the existing LTE, may be a period shorter than 1 ms (for example, 1 to 13 symbols), or may be a period longer than 1 ms. Note that, unit representing TTI may be referred to as a slot, a mini slot, and the like, but not a subframe.

Here, TTI, for example, indicates minimum time unit of scheduling in radio communication. For example, in an LTE system, the base station performs scheduling for allocating a radio resource (a frequency bandwidth, transmission power, and the like that can be used in each of the terminals 20) in TTI unit, with respect to each of the terminals 20. Note that, the definition of TTI is not limited thereto.

TTI may be transmission time unit of a data packet (a transport block), a code block, a codeword, and the like that are subjected to channel coding, or may be processing unit of scheduling, link adaptation, and the like. Note that, when TTI is applied, a time zone in which the transport block, the code block, the codeword, and the like are actually mapped (for example, the number of symbols) may be shorter than TTI.

Note that, in a case where one slot or one mini slot is referred to as TTI, one or more TTIs (that is, one or more slots or one or more mini slots) may be the minimum time unit of the scheduling. In addition, the number of slots (the number of mini slots) configuring the minimum time unit of the scheduling may be controlled.

TTI having a time length of 1 ms may be referred to as a common TTI (TTI in LTE Rel.8-12), a normal TTI, a long TTI, a common subframe, a normal subframe, a long subframe, a slot, and the like. TTI shorter than the common TTI may be referred to as a shortened TTI, a short TTI, a partial TTI (or a fractional TTI), a shortened subframe, a short subframe, a mini slot, a subslot, a slot, and the like.

Note that, the long TTI (for example, the common TTI, the subframe, and the like) may be replaced with TTI having a time length of greater than or equal to 1 ms, and the short TTI (for example, the shortened TTI and the like) may be replaced with TTI having a TTI length of less than a TTI length of the long TTI and greater than or equal to 1 ms.

The resource block (RB) is resource allocation unit of the time domain and the frequency domain, and may include one or a plurality of consecutive subcarriers in the frequency domain. The number of subcarriers included in RB may be the same regardless of the numerology, or for example, may be 12. The number of subcarriers included in RB may be determined based on the numerology.

In addition, the time domain of RB may include one or a plurality of symbols, or may be the length of one slot, one mini slot, one subframe, or one TTI. One TTI, one subframe, and the like may be respectively configured of one or a plurality of resource blocks.

Note that, one or a plurality of RBs may be referred to as a physical resource block (physical RB: PRB), a sub-carrier group (SCG), a resource element group (REG), a PRB pair, a RB pair, and the like.

In addition, the resource block may be configured of one or a plurality of resource elements (RE). For example, one RE may be a radio resource domain of one subcarrier and one symbol.

A bandwidth part (BWP) (may be referred to as a part bandwidth or the like) may represent a subset of consecutive common resource blocks (common RBs) for certain numerology, in a certain carrier. Here, the common RB may be specified by an index of RB based on a common reference point of the carrier. PRB may be defined by a certain BWP, and may be numbered within BWP.

BWP may include BWP for UL (UL BWP) and BWP for DL (DL BWP). In UE, one or a plurality of BWPs may be configured within one carrier.

At least one of the configured BWPs may be active, and it may not assumed that the UE transmits and receives a predetermined signal/channel out of the active BWP. Note that, the "cell", the "carrier", and the like in this disclosure may be replaced with "BWP".

The structure of the radio frame, the subframe, the slot, the mini slot, the symbol, and the like, described above, is merely an example. For example, the configuration of the number of subframes included in the radio frame, the number of slots per a subframe or a radio frame, the number of mini slots included in the slot, the number of symbols and RBs included in the slot or a mini slot, the number of subcarriers included in RB, the number of symbols in TTI, a symbol length, a cyclic prefix (CP) length, and the like can be variously changed.

In this disclosure, for example, in a case where articles such as a, an, and the are added by translation, this disclosure may include a case where nouns following the articles are in the plural.

In this disclosure, the term "A and B are different" may indicate "A and B are different from each other". Note that, the term may indicate "A and B are respectively different from C". The terms "separated", "coupled", and the like may be interpreted as with "being different".

Each aspect/embodiment described in this disclosure may be independently used, may be used by being combined, or may be used by being switched in accordance with execution. In addition, the indication of predetermined information (for example, the indication of "being X") is not limited to being performed explicitly, and may be performed implicitly (for example, the indication of the predetermined information is not performed).

Note that, in this disclosure, the NR-U technology is an example of the technology for an unlicensed frequency band. FR is an example of the frequency range.

As described above, this disclosure has been described in detail, but it is obvious for a person skilled in the art that this disclosure is not limited to the embodiment described in this disclosure. This disclosure can be implemented as corrected and changed modes without departing from the spirit and scope of this disclosure defined by the description of the claims. Therefore, the description in this disclosure is for illustrative purposes and does not have any limiting meaning with respect to this disclosure.

EXPLANATIONS OF LETTERS OR NUMERALS

10 BASE STATION
110 TRANSMISSION UNIT
120 RECEPTION UNIT
130 CONFIGURATION UNIT
140 CONTROL UNIT
20 TERMINAL
210 TRANSMISSION UNIT
220 RECEPTION UNIT
230 CONFIGURATION UNIT
240 CONTROL UNIT
30 CORE NETWORK
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:

a transmitter that transmits capability information of the terminal indicating, in each of frequency bands, whether a function for an unlicensed frequency band is supported, wherein the frequency bands comprise the unlicensed frequency band and a licensed frequency band; and a processor that controls, based on the capability information, reception of configuration information related to the function for the unlicensed frequency band, wherein the configuration information, which is related to the function for the unlicensed frequency band, comprises information, which is associated with a slot format relating to a group common downlink control channel, indicating a bit position in downlink control information where information related to the group common downlink control channel is included, and wherein the bit position in downlink control information is configured for the group common downlink control channel.

2. A base station comprising:

a receiver that receives, from a terminal, capability information of the terminal indicating, in each of frequency bands, whether a function for an unlicensed frequency band is supported, wherein the frequency bands comprise the unlicensed frequency band and a licensed frequency band; and a processor that controls, based on the capability information, transmission of configuration information related to the function for the unlicensed frequency band to the terminal, wherein the configuration information, which is related to the function for the unlicensed frequency band, comprises information, which is associated with a slot format relating to a group common downlink control channel, indicating a bit position in downlink control information where information related to the group common downlink control channel is included, and wherein the bit position in downlink control information is configured for the group common downlink control channel.

3. A communication method performed by a terminal comprising:

transmitting capability information of the terminal indicating, in each of frequency bands, whether a function for an unlicensed frequency band is supported, wherein the frequency bands comprise the unlicensed frequency band and a licensed frequency band; and controlling, based on the capability information, reception of configuration information related to the function for the unlicensed frequency band, wherein the configuration information, which is related to the function for the unlicensed frequency band, comprises information, which is associated with a slot format relating to a group common downlink control channel, indicating a bit position in downlink control information where information related to the group common downlink control channel is included, and wherein the bit position in downlink control information is configured for the group common downlink control channel.

4. A communication system comprising:

a terminal that transmits capability information of the terminal indicating, in each of frequency bands, whether a function for an unlicensed frequency band is supported, wherein the frequency bands comprise the unlicensed frequency band and a licensed frequency band; and a base station that:

receives, from the terminal, the capability information; and transmits, to the terminal, configuration information related to the function for the unlicensed frequency band, based on the capability information, wherein the terminal controls, based on the capability information, reception of the configuration information, wherein the configuration information, which is related to the function for the unlicensed frequency band, comprises information, which is associated with a slot format relating to a group common downlink control channel, indicating a bit position in downlink control information where information related to the group common downlink control channel is included, and wherein the bit position in downlink control information is configured for the group common downlink control channel.

* * * * *